(12) United States Patent
Hirai et al.

(10) Patent No.: US 8,009,909 B2
(45) Date of Patent: Aug. 30, 2011

(54) IMAGE PROCESSING APPARATUS AND ITS METHOD

(75) Inventors: Tatsuhiko Hirai, Tokyo (JP); Tadanori Nakatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1318 days.

(21) Appl. No.: 11/387,649

(22) Filed: Mar. 23, 2006

(65) Prior Publication Data

US 2006/0215233 A1    Sep. 28, 2006

(30) Foreign Application Priority Data

Mar. 23, 2005    (JP) ................................. 2005-084513

(51) Int. Cl.
G06K 9/00    (2006.01)
G06K 9/34    (2006.01)
(52) U.S. Cl. ....................................... 382/173; 382/100
(58) Field of Classification Search ........................ None
See application file for complete search history.

(56) References Cited

U.S. PATENT DOCUMENTS

2004/0125402 A1*    7/2004    Kanai et al. .................. 358/1.15

FOREIGN PATENT DOCUMENTS

| JP | 2000-106624 | | 4/2000 |
|---|---|---|---|
| JP | 2003-008871 | A | 1/2003 |
| JP | 2003-032488 | A | 1/2003 |
| JP | 2004-222189 | A | 8/2004 |

OTHER PUBLICATIONS

The above references were cited in a Dec. 7, 2009 Japanese Office Action, which is enclosed with Partial English Translation, that issued in Japanese Patent Application No. 2005-084513.

* cited by examiner

Primary Examiner — Yuzhen Ge
(74) Attorney, Agent, or Firm — Cowan, Liebowitz & Latman, P.C.

(57) ABSTRACT

Even through security information is embedded in a printed document, if the security level is changed after original data is printed, it is impossible to change the security level of a printed document. Hence, when vector data is generated from the printed document, vector data with a low security level is obtained, and that vector data can be edited and printed. Hence, a document image is read, the read image is segmented into image regions of different attributes, and pointer information embedded in each image region is extracted. An image of the image region from which no pointer information is extracted and whose vector conversion is instructed by the user is converted into vector data. A security level is set in the vector data, and the vector data set with the security level is registered in a server.

16 Claims, 16 Drawing Sheets

FIG. 5A

BLOCK INFORMATION

| | ATTRIBUTE | COORDINATE X | COORDINATE Y | WIDTH W | HEIGHT H | POINTER INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*ATTRIBUTE 1 : TEXT   2 : PICTURE   3 : TABLE   4 : LINE   5 : PHOTO

FIG. 5B

INPUT FILE INFORMATION

| TOTAL NUMBER OF BLOCKS | N(=6) |
|---|---|

FIG. 8

| IMAGE NAME | AREA COORDINATES | SECURITY LEVEL | POINTER INFORMATION |
|---|---|---|---|
| Word040211 | (10, 10)<br>(100, 200) | 1 | 192.168.100.5 |
| Word040122 | (10, 300)<br>(4000, 5000) | 2 | //server/home/word/ |
| Pict_MFP04 | (500, 1500)<br>(5000, 7000) | 5 | pict……co.jp |

F I G. 16
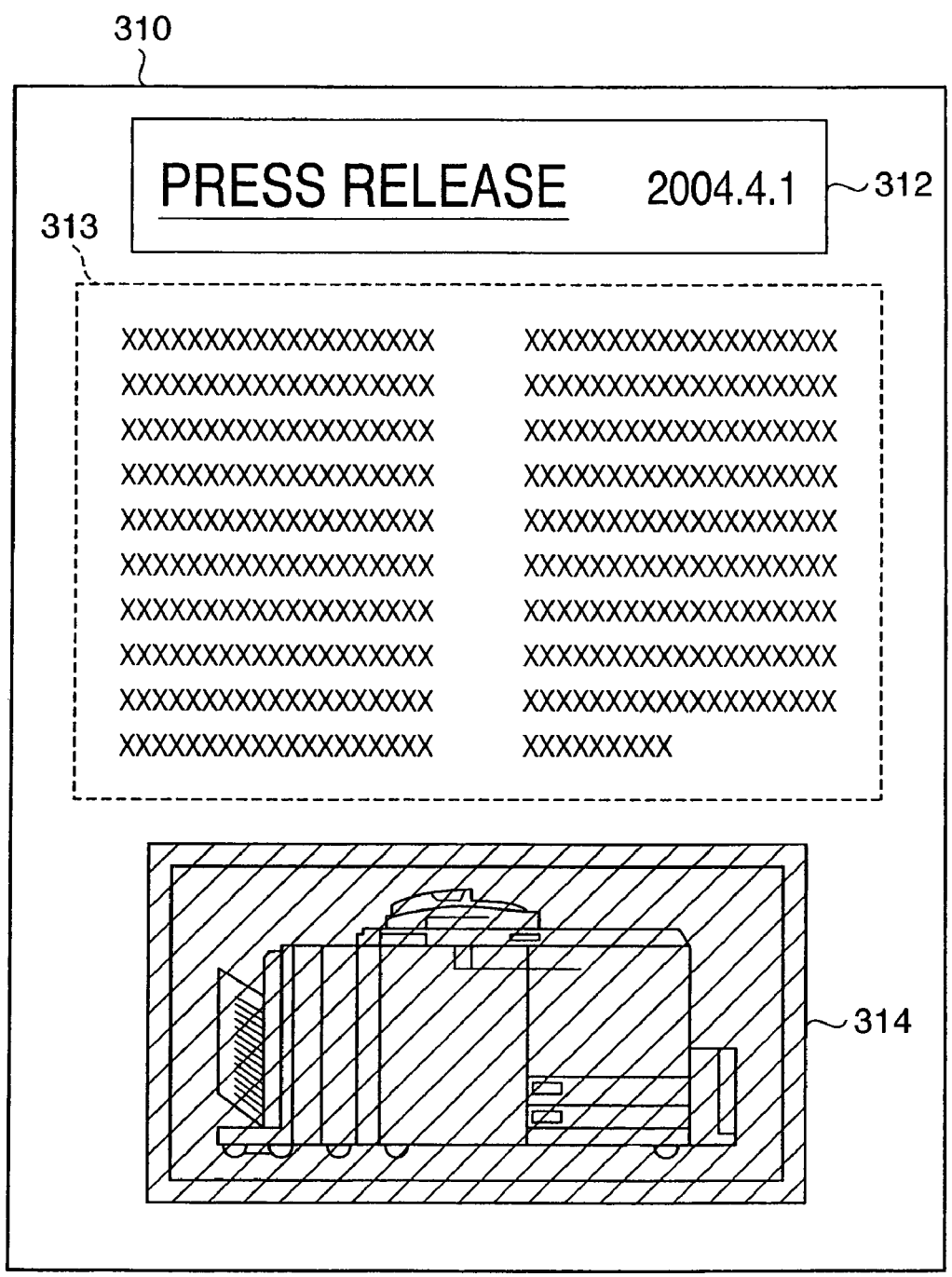

IMAGE PROCESSING APPARATUS AND ITS METHOD

FIELD OF THE INVENTION

The present invention relates to an image processing apparatus and its method and, more particularly, to image processing that reuses document (image) data.

BACKGROUND OF THE INVENTION

Using a multi-functional peripheral equipment (MF) as a function-expanded recording apparatus, original data of text and image data are stored in an image storage device. When original data is printed as a document on print sheets, it can be converted into vector data which can be edited. This vector data can be re-edited and printed. However, easily editable vector data not only allows easy falsification but also poses a copyright protection problem. Therefore, a security level must be set for each vector data.

As a method of setting the security level, for example, a method of embedding information such as a digital watermark or the like which cannot be perceived by the human being has been proposed. Also, as a digital watermark technique, a method of computing the wavelet transforms of image data, and embedding a digital watermark by exploiting redundancy in the frequency domain (Japanese Patent Laid-Open No. 2000-106624 or the like is known.

However, even when security information is embedded as a digital watermark, if the security level is changed after original data (or vector data) is printed, it is impossible to change the security level of the printed document. Therefore, when vector data is generated from the printed document, vector data with a low security level is obtained. For this reason, even though the security level of original data (or vector data) is increased, newly generated vector data can be edited and printed.

SUMMARY OF THE INVENTION

The first aspect of the present invention discloses image processing comprising the steps of:

segmenting a read image into image regions having different attributes; extracting pointer information embedded in each of the image regions; converting an image of the image region, from which the pointer information is not extracted and whose vector conversion is instructed by a user, into vector data; setting a security level in the vector data; and registering the vector data set with the security level in a server.

According to the present invention, a change in security level can be reflected upon reusing document (image) data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B show an example of the block selection result;

FIG. 8 is a table showing data (three examples) incorporated in a two-dimensional code;

FIG. 16 shows an edit example of objects.

DESCRIPTION OF THE PREFERRED EMBODIMENTS

Image processing according to preferred embodiments of the present invention will be described in detail hereinafter with reference to the accompanying drawings.

First Embodiment

[Image Processing System]

Figure 1:
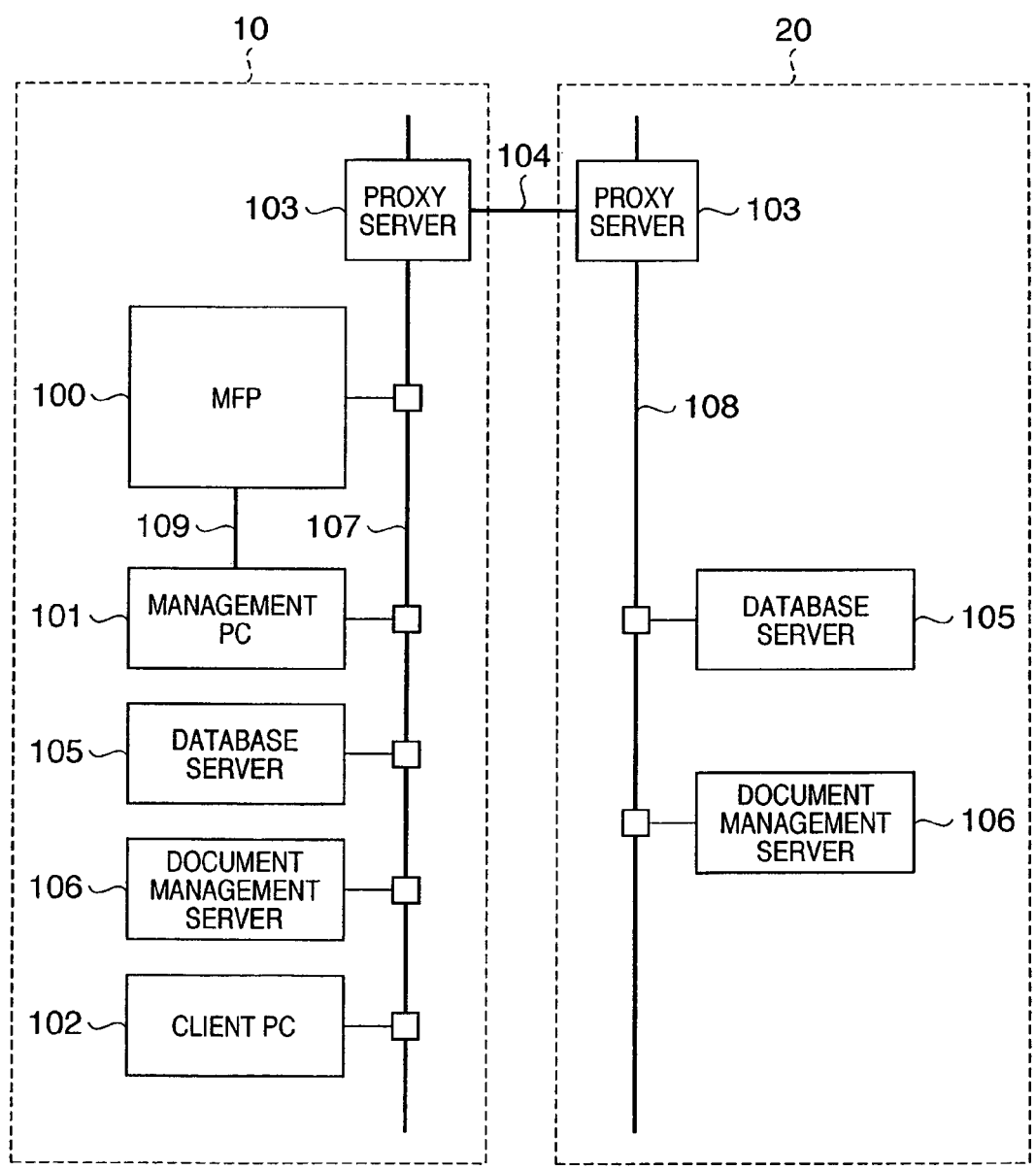
FIG. 1 is a block diagram showing the arrangement of an image processing system which digitizes information using a multi-functional peripheral equipment (MFP)

FIG. 1 is a block diagram showing the arrangement of an image processing system which digitizes information using an MFP.

This image processing system is implemented in an environment in which offices (or a plurality of office-like partitions) 10 and 20 are connected via a wide area network (WAN) 104 such as the Internet or the like.

To a local area network (LAN) 107 formed in the office 10, an MFP 100, a management PC 101 which controls the MFP 100, a client PC 102, a document management server 106, a database server 105 managed by the document management server 106, and the like are connected. The office 20 has substantially the same arrangement as that of the office 10. To a LAN 108 formed in the office 20, at least a document management server 106, a database server 105 managed by the document management server 106, and the like are connected. The LANs 107 and 108 of the offices 10 and 20 are connected to each other via a proxy server 103 connected to the LAN 107, the WAN 104, and another proxy server 103 connected to the LAN 108.

The MFP 100 does some of image processes for reading a document image, and processing a read image. An image signal output from the MFP 100 is input to the management PC 101 via a communication line 109. The management PC 101 comprises a normal personal computer (PC). The management PC 101 has a memory such as a hard disk or the like for storing images, an image processor implemented by hardware or software, a monitor such as a CRT, LCD, or the like, and an input unit including a mouse, keyboard, and the like. Some components of the management PC 101 are integrally formed with the MFP 100. Note that a case will be exemplified hereinafter wherein the management PC 101 executes the following processing and the like, but the MFP 100 may execute the processing to be executed by the management PC 101.

[MFP]

Figure 2:
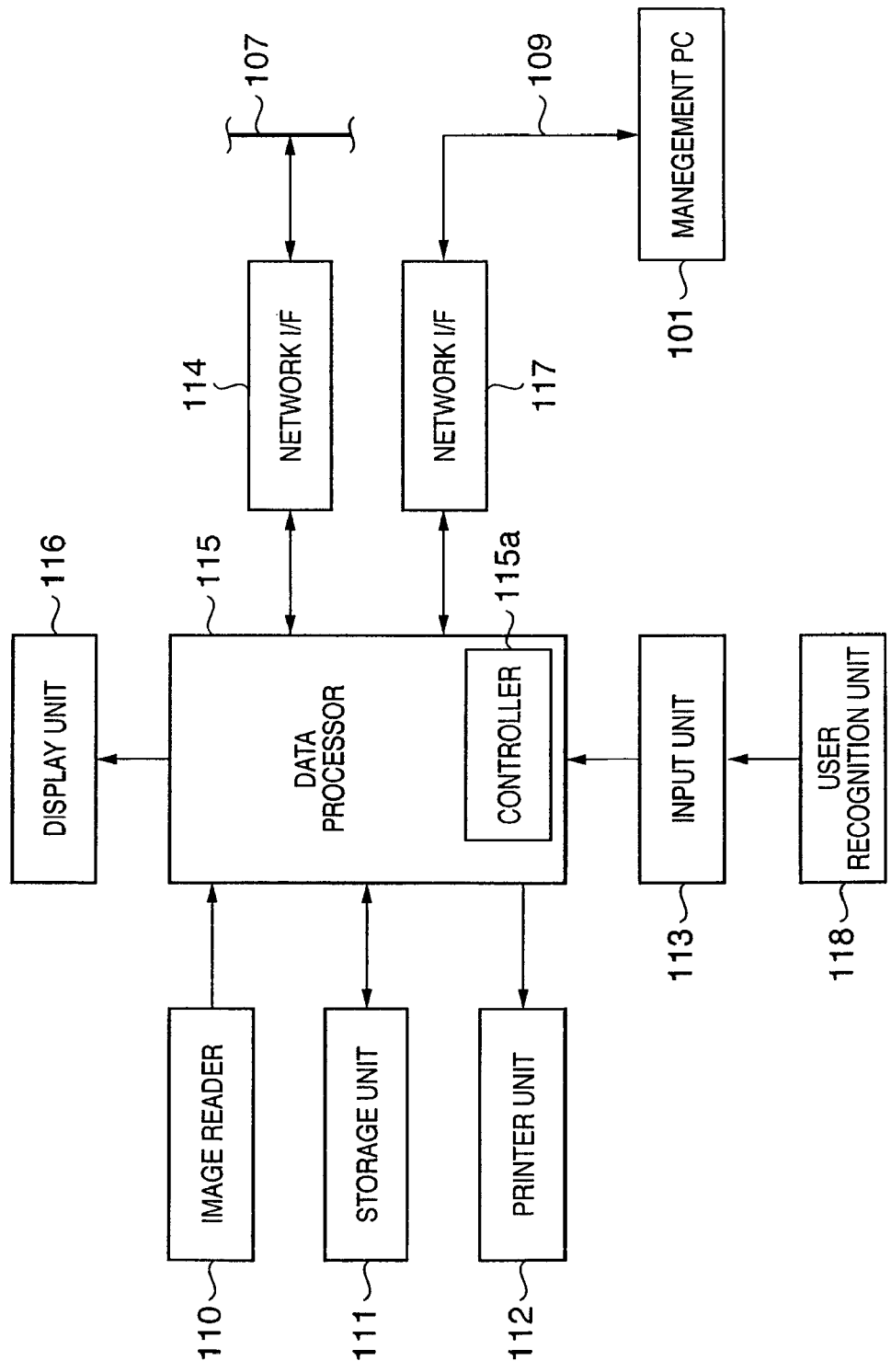
FIG. 2 is a block diagram showing the arrangement of the MFP.

FIG. 2 is a block diagram showing the arrangement of the MFP 100.

An image reader 110 including an auto document feeder (ADF) irradiates an image on each of one or a plurality of stacked documents with light, and forms an image of light reflected by the document on a solid-state image sensing element via a lens. Then, the image reader 110 obtains a read image signal (e.g., 600 dpi, 8 bits) in the raster order from the solid-state image sensing element. When a document is to be copied, a data processor 115 converts this read image signal into a print signal. When an image is copied on a plurality of print sheets, the data processor 115 temporarily stores a print signal for one page in a storage unit 111, and repetitively outputs the print signal to a printer unit 112, thus forming images on the plurality of print sheets.

On the other hand, print data output from the client PC 102 is input to a network interface (I/F) 114 via the LAN 107. The print data is converted into printable raster data by the data processor 115, and is formed by the printer unit 112 as an image on a print sheet.

An input unit 113 which includes a key operation unit equipped on the MFP 100 and a keyboard and mouse of the management PC 101 is used to input operator's instruction to the MFP 100. A display unit 116 displays operation inputs, image processing states, and the like.

The operation of the MFP 100 is controlled by a controller 115a which is included in the data processor 115 and comprises, e.g., a one-chip microcontroller.

Note that the storage unit 111 can also be controlled from the management PC 101. Data exchange and control between the MFP 100 and management PC 101 are made via a network I/F 117 and the signal line 109 which directly connects them.

Note that the MFP 100 may comprise an interface which acquires image data from an image sensing apparatus such as a digital camera, digital video, or the like, a portable terminal such as a portable data assistant (PDA), a facsimile, or the like as a part of the input unit 113.

A user recognition unit 118 used to identify the user is connected to the input unit 113. The user recognition unit 118 is, e.g., an IC card reader, keys used to input an ID or password, a biometric device that identifies biometric information such as fingerprints, a handprint, a capillary pattern, an iris, or the like. The user recognition unit 118 inputs information that identifies the user who uses the MFP 100 (to be referred to as "user identifying information" hereinafter), and outputs the user identifying information to the data processor 115 via the input unit 113.

Also, information indicating the security level of each user of the MFP 100 is set and stored in a nonvolatile memory of the data processor 115 or that of the management PC 101 (e.g., a hard disk). Therefore, the data processor 115 can acquire the security level corresponding to the user identifying information input from the user recognition unit 118. When an IC card reader is used as the user recognition unit 118, the user recognition unit 118 may notify the data processor 115 of the security level stored in a memory in an IC card.

In the following description, an event that the data processor 115 acquires the security level corresponding to the user identifying information acquired by the user recognition unit 118 (or it directly acquires the security level from the user recognition unit 118) will be referred to as "user authentication".

[Overview of Processing]

When a document storage instruction is input from the input unit 113, the MFP 100 reads a document image using the image reader 110. Then, the MFP 100 then transmits the document image, which is converted by the data processor 115 into a print signal that can print an image, to the document management server 106 or client PC 102 via the network I/F 114 or 117, or stores it in the storage unit 111.

When a document search instruction is input from the input unit 113, the MFP 100 reads a document image using the image reader 110, and detects pointer information present on a specific region of the document image. The pointer information indicates the location of original data, and is appended to the document image as, e.g., a two-dimensional code. The pointer information to be appended is not limited to the two-dimensional code, but it may be appended by a so-called digital watermark method which is not directly visually seen such as a method of embedding information in an image by utilizing a change in spacing between neighboring character strings, a method of embedding information in a halftone image, and the like.

The MFP 100 searches the storage unit 111, database server 105, and client PC 102 for original data of the document image in accordance with the detected pointer information. Upon detection of the original data, the MFP 100 supplies the read document image and original data to the management PC 101. This is to print out an original document based on the original data and to determine if the read document image matches the original data or if it is falsified.

[Flow of Processing]

Figure 3:
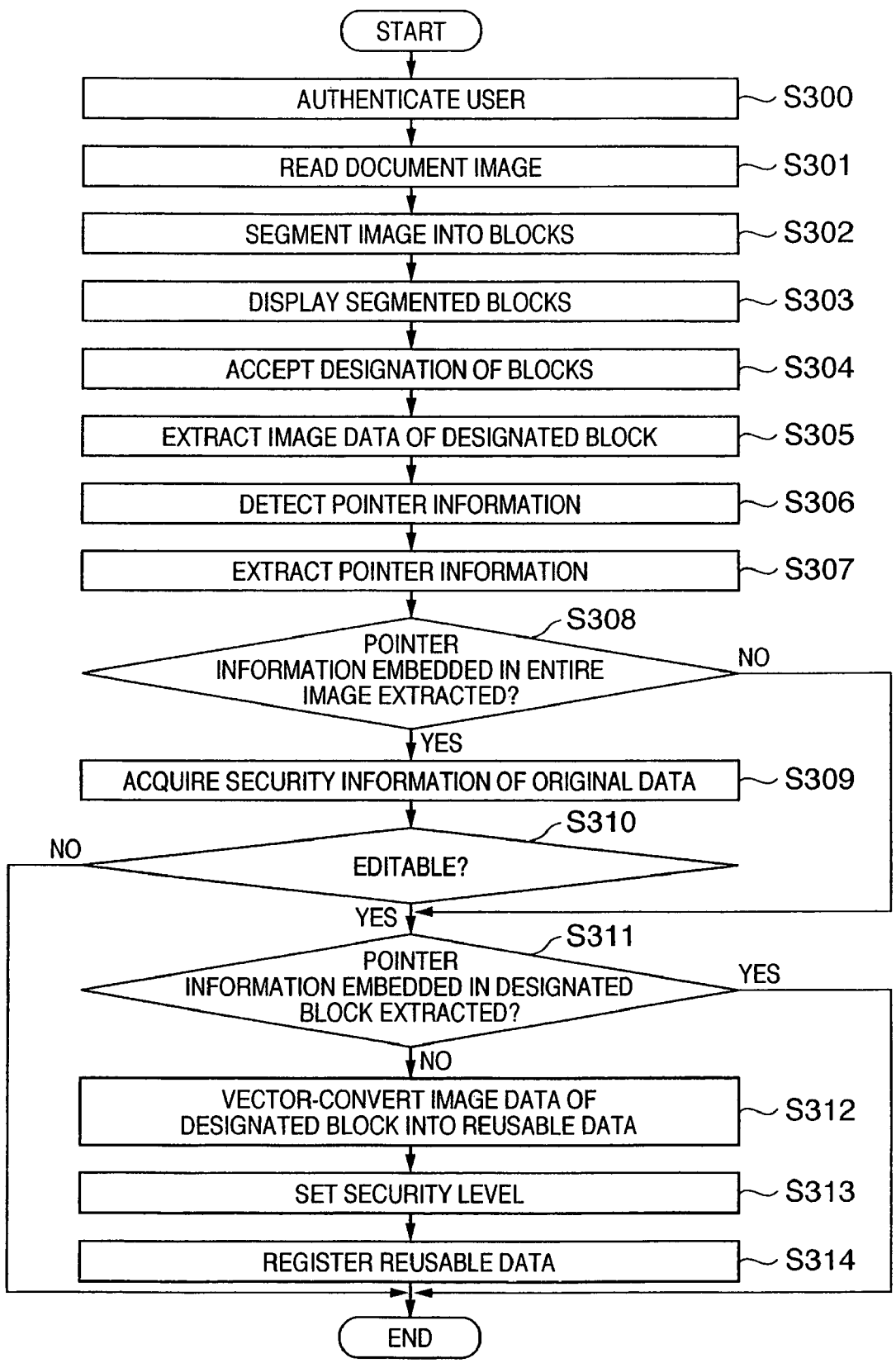
FIG. 3 is a flowchart for explaining an overview of processing by the image processing system shown in FIG. 1.

FIG. 3 is a flowchart for explaining the flow of the processing by the aforementioned image processing system. This processing is executed by the management PC 101 or data processor 115 or a combination of them.

The MFP 100 performs user authentication (S300). If the input ID, password, or biometric information is not registered, the MFP 100 displays an authentication failure message on the display unit 116. Note that the security level is, for example, classified into five levels in correspondence with those of a document (image) as follows:

| Security level of user | Security level of document that can be printed and edited |
| --- | --- |
| 5 | all (no limitation) |
| 4 | level 4 or less |
| 3 | level 3 or less |
| 2 | level 2 or less |
| 1 | level 1 |

In the above table, a document (image) of security level 1 is not set with any security, and the user of security level 1 can print and edit a document without any security (a document image of security level 1) but he or she cannot print and edit a document set with security (a document image of security level 2 or higher). The user of security level 2 can print and edit a document image of security level 2 or less, but he or she cannot print and edit a document image of security level 3 or higher. Such control is made.

If user authentication has succeeded, the MFP 100 enables the image reader 110 to scan a document image for one page in the raster order, thus acquiring a read image signal. The read image signal is pre-processed by the data processor 115, and is saved in the storage unit 111 as image data for one page of the input image (S301).

Next, the management PC 101 executes block selection (BS) processing to segment the image data stored in the storage unit 111 into a text and line region including character or line images, a halftone photo region, an image region with an indeterminate form, and other regions. Furthermore the text and line region is segmented into a text region mainly including characters and a line region mainly including a table, picture, or the like, and the line region is segmented into a table region and picture region (S302). Note that the first embodiment detects connected pixels, and segments image data into regions of respective attributes using the shapes, sizes, pixel densities, and the like of circumscribed rectangular regions of the connected pixels. However, other region segmentation methods may be used.

The text region is segmented into rectangular blocks (text region rectangular blocks) to have clusters such as paragraphs and the like as blocks. The line region is segmented into rectangular blocks of individual objects (table region rectangular block, line region rectangular block) such as a table, picture, and the like. The photo region expressed by halftone is segmented into rectangular blocks such as an image region rectangular block, background region rectangular block, and the like. Note that information of these rectangular blocks will be referred to as "block selection information" hereinafter.

Figure 4:
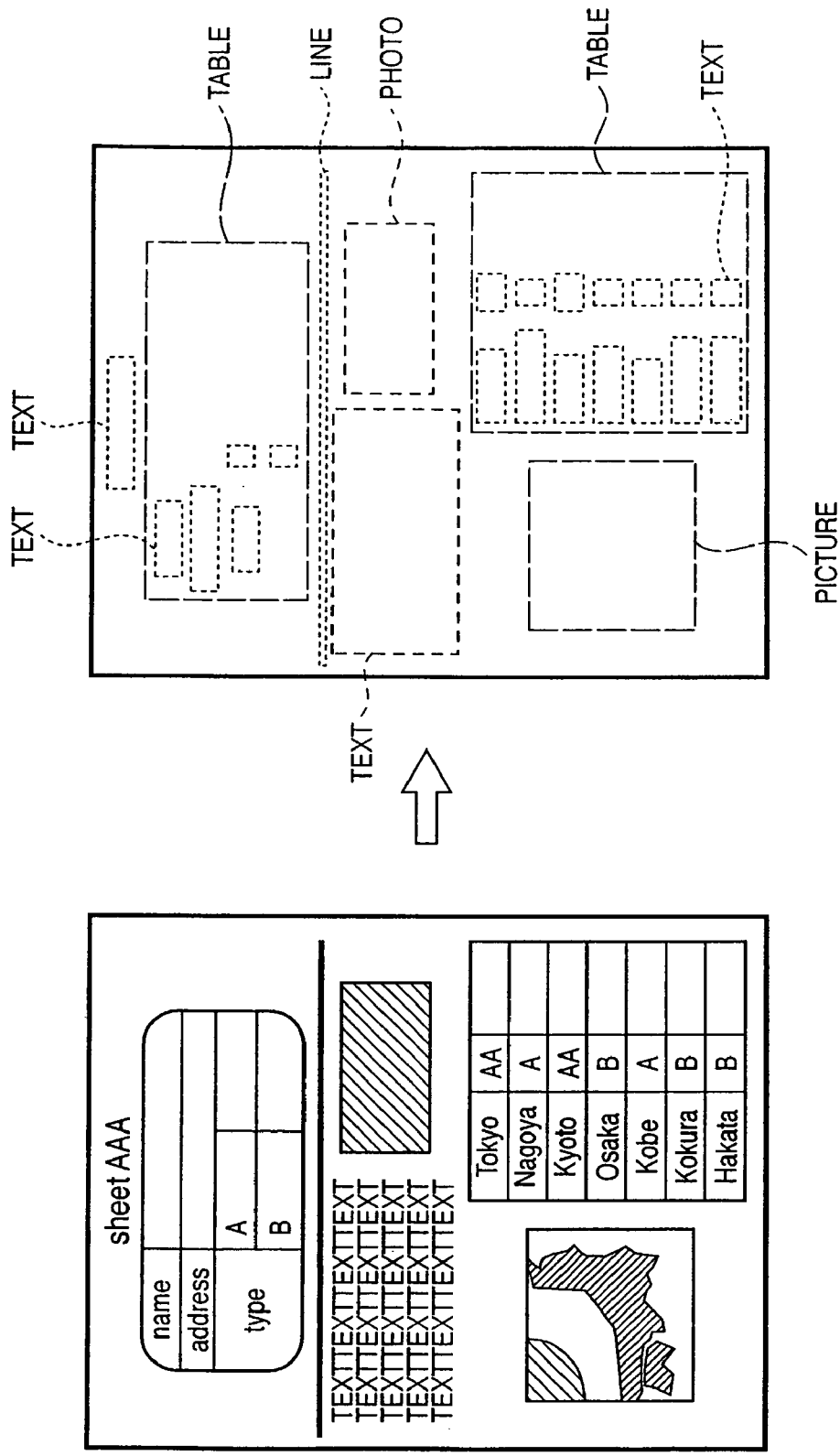
FIG. 4 shows a display example of an operation window.

The data processor 115 combines the block selection information obtained by the BS processing (block selection processing) and the input image and displays them on an operation window of the display unit 116 (S303), as exemplified in FIG. 4. The input image itself is displayed on the left side of the operation window, and the block selection information is displayed as rectangular blocks on the right side. Note that FIG. 4 shows character strings TEXT, PICTURE, LINE, TABLE, and the like indicating their attributes in correspondence with respective blocks so as to allow easy understanding of rectangular blocks. However, such attribute information is not displayed on the actual operation window, and the rectangular blocks are displayed as frame borders. The attribute information TEXT indicates a text attribute; PICTURE, a picture attribute; PHOTO, a photo attribute; LINE, a line attribute; and TABLE, a table attribute. Of course, in addition to side-by-side display of the input image and block selection information shown in FIG. 4, they may be overlaid on each other so that the rectangular blocks are displayed on the input image. Hence, various other display modes are available.

Next, the user designates a rectangular block (segment) to be vector-converted from those displayed on the operation window (S304). As a method of designating a block, various methods may be adopted. For example, the user may designate one or a plurality of segments using a pointing device. Alternatively, the operation window may comprise a touch panel, and the user may designate a desired segment by touching it with a finger.

The management PC 101 extracts image data of the designated block to apply the following processes to the designated block notified by the data processor 115 (S305). The management PC 101 executes optical character recognition (OCR) processing and optical mark recognition (OMR) processing so as to detect pointer information to original data, which is embedded in the image of the extracted designated block and the entire image (S306). More specifically, the management PC 101 detects an object corresponding to a two-dimensional code or a URL recorded as additional information in the input image, and performs character recognition of the URL by OCR or decodes the two-dimensional code by OMR, thus detecting pointer information. As means for appending pointer information, the present invention is not limited to a two-dimensional code, but it may be appended by a so-called digital watermark method which is not directly visually seen such as a method of embedding information in an image by utilizing a change in spacing between neighboring character strings, a method of embedding information in a halftone image, and the like.

The management PC 101 extracts pointer information from the OCR/OMR processing result or digital watermark information (S307). The pointer information is made up of a path name including a file server name and file name, a URL indicating a corresponding file, or the like.

The management PC 101 checks if the pointer information embedded in the entire image is extracted (S308). If no pointer information is extracted, the flow jumps to step S311. If the pointer information is extracted, the latest security level which is set in original data of the entire image (document) is acquired from the storage unit (hard disk or the like) of the client PC 102, database server 105, or storage unit 111 on the basis of the pointer information (S309) The management PC 101 compares the acquired security level with that of the user to see if the document of interest can be edited (S310). If the security level of the user is "3", and if that of the document is "4" or higher, since that document cannot be edited, the processing ends. On the other hand, if the security level of the document is "3" or les, since the image data of the designated block can be converted into reusable data and can be registered, the following processing is executed.

A registerer of original data of a document (image) can arbitrarily change the security level of that document (image). Original data of a document (image) stored in the client PC 102, database server 105, storage unit 111, or the like is recorded with ID information of the registerer. The registerer operates the input unit 113 to search for a document (image) registered by himself or herself based on information such as a registration date, file name, data size, data type, and the like. The registerer designates a document (image), the security level of which is to be changed, from documents (images) listed on the display unit 116, and can change its security level. Therefore, the security level changes every seconds depending on situations. For this reason, the security level which is embedded in a document printed previously is likely to be different from the current security level, and the latest security level must always be acquired from the aforementioned storage unit.

If the document can be edited, the management PC 101 checks if the pointer information is extracted from each designated block (S311). As for the designated block from which the pointer information is extracted, since original data has already been registered, the following processing is skipped. On the other hand, the following processing is executed for the designated block from which no pointer information is extracted. Note that the relationship between the designated block and the extraction result of the pointer information is preferably displayed on the display unit 116 to notify the user of it.

The management PC 101 vector-converts image data of the designated block, from which no pointer information is extracted, into reusable data by vector conversion processing (to be described later) (S312). Then, the management PC 101 accepts designation of a security level according to the importance of the image of the designated block from the user, and sets the security level in the reusable data (S313). If no security level is designated, the lowest security level, "1", as a prescribed value is set. If there are a plurality of designated blocks, the user can designate a security level for each designated block. However, an identical security level is set for all the designated blocks unless the user changes the security level.

The management PC 101 registers the reusable data of the designated block, in which the security level and the ID information of the registerer are recorded, in the database server 105 or the storage unit 111 of the MFP 100 (S314), thus ending the processing.

In this way, since the image data of the segment having pointer information (in other words, the original data of which exists) does not undergo vector conversion, reusable data to which a change in security level is not reflected can be prevented from being generated. When the reusable data which is registered in this way is printed, the pointer information, security information, and the like of that data are embedded in that segment.

The reusable data will be briefly explained below. Since data formats depend on applications to be used, data must be converted into a file format for its specific purpose. For example, wordprocessor software, spreadsheet software, and the like as representative application software define file formats for different purposes. Therefore, data obtained by the vector conversion processing (to be described later) is converted into that file format (application data format). As general-purpose file formats, for example, a Rich Text Format (RTF) format laid down by Microsoft®, and a Scalable Vector Graphics (SVG) format which has become popular in recent years and is proposed by World Wide Web Consortium (W3C) are available. Also, a plain text format that simply handles text data alone, and the like is available. These data formats are more likely to be commonly used in various kinds of application software.

The processes of principal steps shown in FIG. 3 will be described in detail below.

[Block Selection (S302)]

Block selection (region segmentation) is processing for recognizing the image for one page shown in FIG. 4 as a set of objects, determining attributes of the respective objects as TEXT, PICTURE, PHOTO, LINE, and TABLE, and segmenting them into segments (blocks) having different attributes. A practical example of block selection will be described below.

An image to be processed is binarized to a monochrome image, and a cluster of pixels bounded by black pixels is extracted by outline tracing. For a cluster of black pixels with a predetermined area or more, outline tracing is also made for white pixels in the cluster to extract clusters of white pixels. Furthermore, extraction of clusters of black and white pixels is recursively repeated so that a cluster of black pixels is extracted from the cluster of white pixels with a predetermined area or more.

Rectangular blocks which circumscribe the pixel clusters obtained in this way are generated, and their attributes are determined based on the sizes and shapes of the rectangular blocks. For example, a pixel cluster which has an aspect ratio close to 1, and has a size that falls within a predetermined range is determined as that of a text attribute. Furthermore, when neighboring pixel clusters of the text attribute regularly line up and can be grouped, they are determined as a text region. Also, a low-profile pixel cluster with a small aspect ratio is categorized as a line region. In addition, a range occupied by black pixel clusters that include rectangular white pixel clusters which have a predetermined size or more and a size close to a rectangle and regularly line up is categorized as a table region. Furthermore, a region where pixel clusters with indeterminate forms are distributed is categorized as a photo region. Other pixel clusters with an arbitrary shape are categorized as a picture region.

FIGS. 5A and 5B show an example of the block selection result. FIG. 5A shows block information of each extracted rectangular block. The block information includes an attribute, coordinates X and Y of a position, width W, height H, pointer information, and the like of each block. Attributes are given as numerical values 1 to 5: "1" indicates a text attribute; "2", a picture attribute; "3", a table attribute; "4", a line attribute; and "5", a photo attribute. The coordinates X and Y indicate the X- and Y-coordinates (those of the upper left corner) of a start point of each rectangular block of the input image, the width W and height H indicate the width in the X-coordinate direction and the height in the Y-coordinate direction of the rectangular block, and the pointer information indicates the presence/absence of it.

FIG. 5B shows input file information, which indicates the total number of rectangular blocks extracted by block selection.

The block information for each rectangular block is used in vector conversion of a specific region. Based on the block information, the relative positional relationship between the vector-converted specific region and raster data can be specified, and the vector-converted region and raster data regions can be combined without damaging the layout of the input image.

[Extraction of Pointer Information (S307)]

Figure 6:
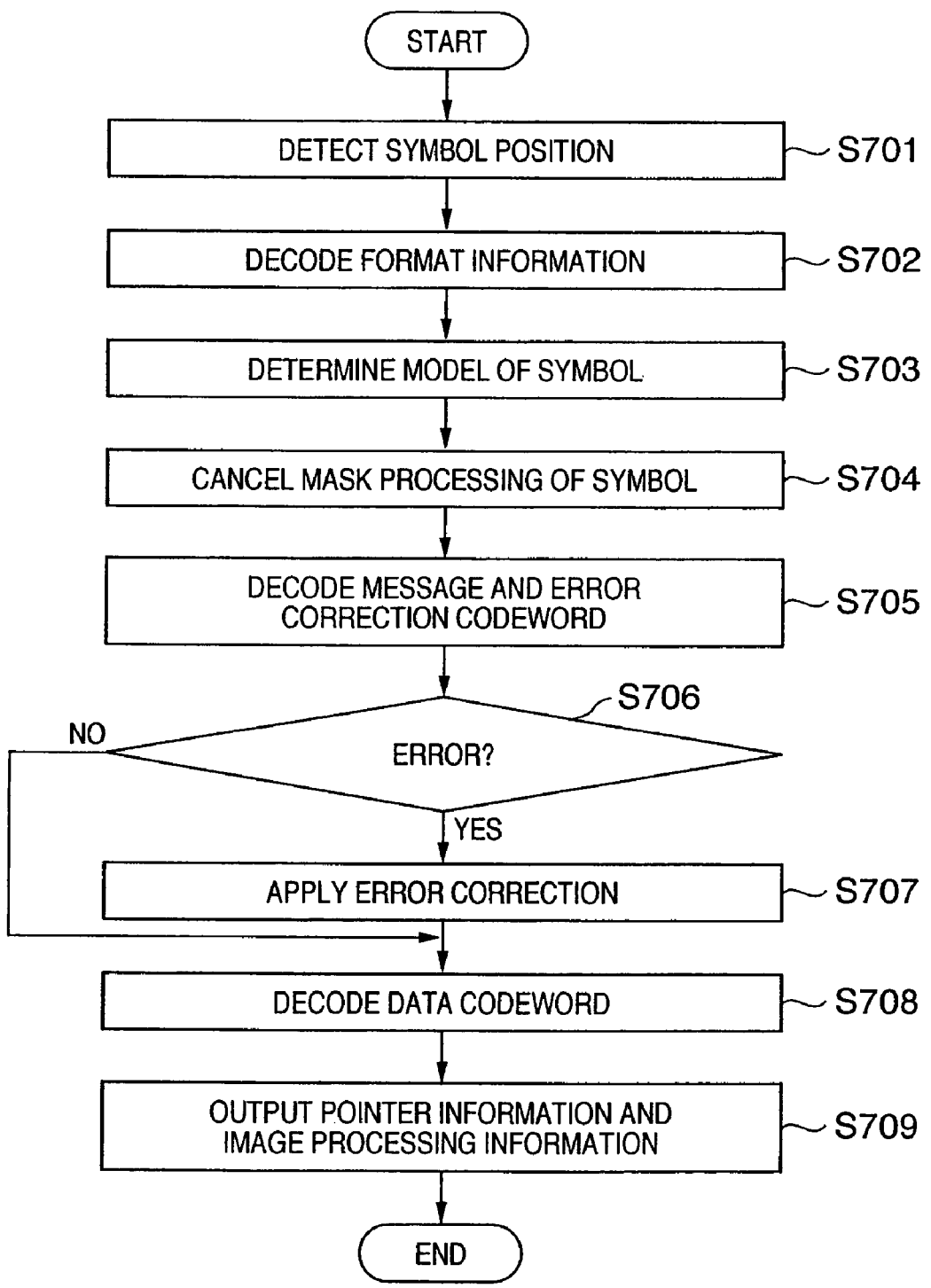
FIG. 6 is a flowchart showing processing for extracting pointer information from image data of a segment.
Figure 7:
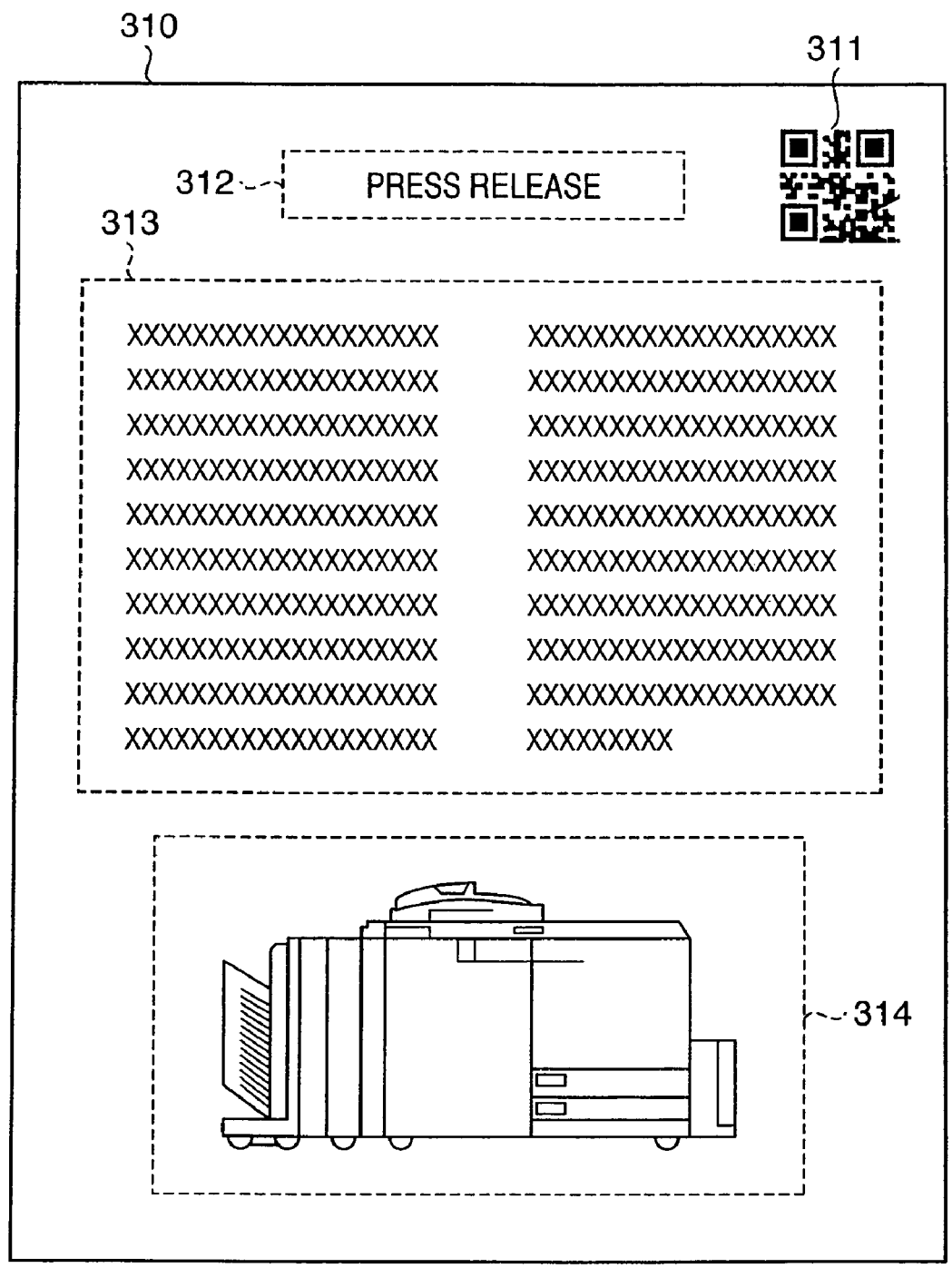
FIG. 7 shows an example of a document image including pointer information.

FIG. 6 is a flowchart showing the processing for extracting pointer information from image data of a segment. This processing is executed by the data processor 115 (or management PC 101) after image data to be extracted is stored in a page memory (not shown) of the data processor 115. A document 310 to be extracted includes text regions 312 and 313, a photo region 314, and a two-dimensional code (e.g., QR code®) symbol 311, as shown in, e.g., FIG. 7.

From block information as the processing result of block selection, the position of the two-dimensional code symbol is detected (S701). In case of a QR code® symbol, specific position detection patterns are allocated at three out of the four corners, and the QR code® symbol can be detected by detecting the position detection patterns.

Format information which neighbors the position detection patterns is decoded to acquire an error correction level and mask pattern applied to the symbol (S702), thus determining a model of the symbol (S703). Using the acquired mask pattern, an encoded region bit pattern of the two-dimensional code symbol is XORed, thus canceling mask processing of the two-dimensional code symbol (S704).

A layout rule is acquired based on the determined model, and symbol characters are read based on the layout rule, thus decoding a message and error correction codeword (S705). An error of the decoded message is detected based on the error correction codeword (S706). If any error is detected, the decoded message is corrected (S707).

A data codeword is broken up into segments based on a mode specifier and character count specifier from the decoded message, thus decoding the data codeword (S708). Then, data code characters are decoded based on the detected specification mode, and are output as pointer information (S709).

Data incorporated in the two-dimensional code indicates pointer information and security information of an original data file. The pointer information is made up of a path name including a file server name and file name, a URL indicating a corresponding file, or the like. A security level included in the security information is that which is set when the document 310 is printed or that which is set by the user when the security level is not registered. Therefore, this security level is often different from the current security level.

FIG. 8 shows data (three examples) incorporated in the two-dimensional code. Data includes an image name (or file name), layout position information (area coordinates) in the document, a security level, and pointer information. As the pointer information, an IP address, path name, URL, or the like can be used.

The first embodiment has exemplified an example of image data to which pointer information and image processing information are appended in the form of the two-dimensional code. As a recording mode of the pointer information and image processing information, various methods can be adopted. For example, pointer information and image processing information may be directly recorded as a character string using a character string according to a predetermined rule (e.g., encryption), and a rectangular block of the character string may be detected by block selection. By recognizing (e.g., decoding) the detected character string, the pointer information and image processing information can be acquired. Alternatively, in a text region, modulation which is hardly visually recognized is applied to spacings of neighboring character strings, and the pointer information and image processing information can be expressed by the modulation information of the spacings of the character strings. Such digital watermark information can be detected by detecting the spacings of neighboring characters upon executing character recognition processing (to be described later), and the pointer information and image processing information can be acquired. Of course, the pointer information and image processing information can be appended to a photo region or picture region as a digital watermark.

Upon extraction of pointer information, by designating a region to be vector-converted, the pointer information can be quickly and reliably acquired from the designated region. In other words, when the user designates a segment where the two-dimensional code is recorded or a segment in which a digital watermark may be embedded, the pointer information can be efficiently extracted.

[Acquisition of Security Information (S309)]

The management PC 101 specifies a file server based on the pointer information. The management PC 101 accesses the file server (which corresponds to the data processor 115 of the MFP 100, the client PC 102, or the document management server 106) to request the security information of original data. Upon reception of this request, the file server searches for original data based on the attached pointer information.

When the file server detects original data, it returns the security level set in the original data to the management PC 101. If the file server fails to detect original data, it sends a message that advises accordingly to the management PC 101.

Of course, the management PC 101 can request original data based on the pointer information. When the file server detects original data, it transfers the original data to the data processor 115 of the MFP 100. If the file server fails to detect original data, it sends a message that advises accordingly to the management PC 101.

[Vector Conversion Processing (S312)]

As the vector conversion, the following schemes are available.

(a) In case of a segment of the text attribute, a character pattern is converted into a character code by OCR processing, or is converted into visually faithful font data by recognizing the size, style, and face of a character.

(b) In case of a segment of the line or text attribute which cannot undergo character recognition by the OCR processing, an outline of a line image or character is traced, and outline information is converted into a format that expresses the line image or character as connection of line segments.

(c) In case of a segment of the picture attribute, an outline of a picture object is traced, and outline information is converted into a format that expresses outline information as connection of line segments.

(d) The outline information of a line segment format obtained by the scheme (b) or (c) undergoes fitting by a Bezier function or the like to be converted into function information.

(e) The shape of the picture is recognized based on the outline information of the picture object obtained by the scheme (c), and is converted into figure definition information such as a circle, rectangle, polygon, or the like.

(f) In case of a segment of the table attribute, ruled lines and frame borders are recognized, and are converted into form information of a predetermined format.

In addition to the aforementioned schemes, various kinds of vector conversion processing which replace image data by command definition type information such as code information, picture information, function information, and the like are available.

[Vector Conversion of Text Region]

Figure 9:
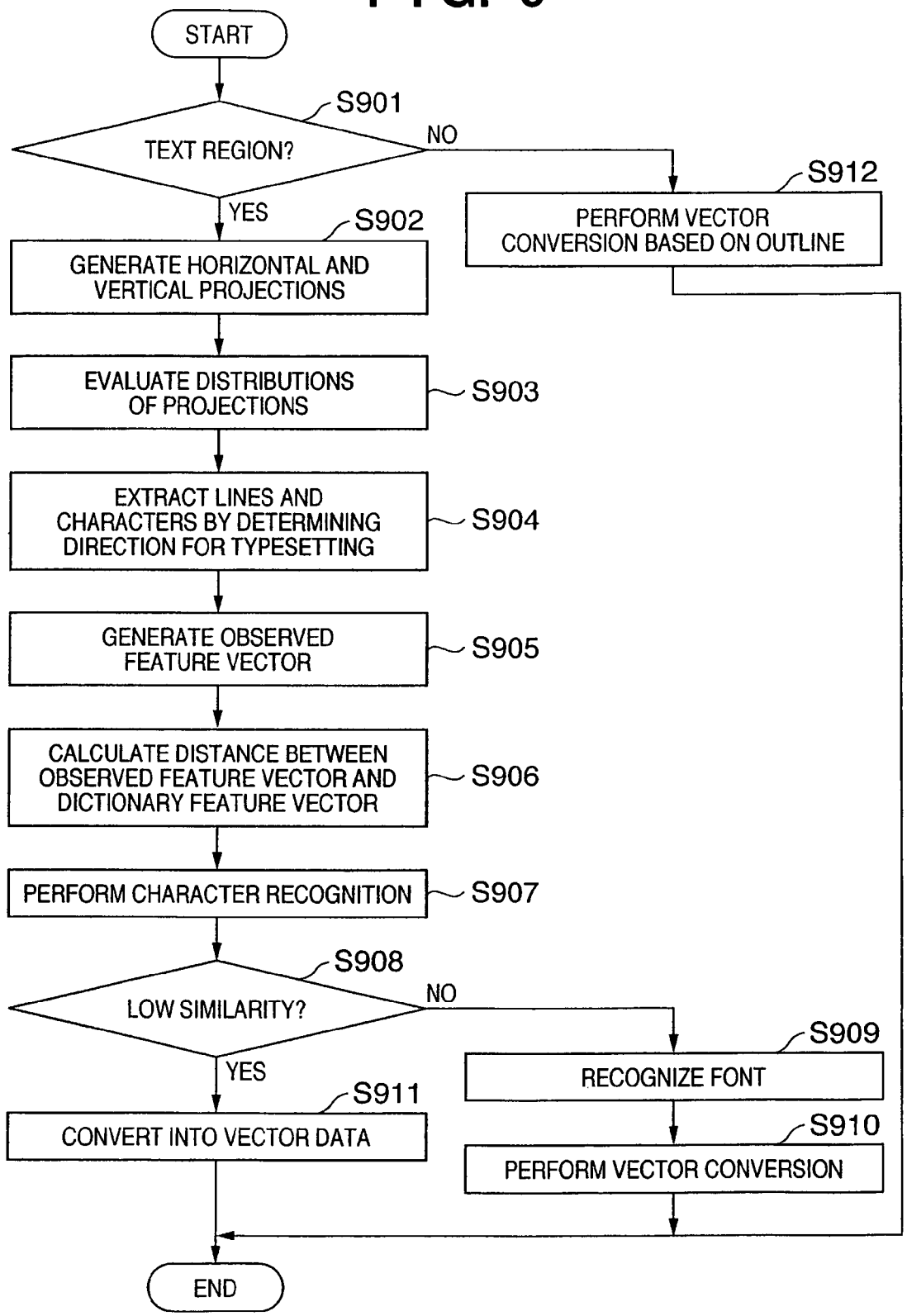
FIG. 9 is a flowchart showing details of vector conversion processing.

FIG. 9 is a flowchart showing details of the vector conversion processing (S312), which is the processing executed by the data processor 115 (or management PC 101).

It is checked with reference to block information if a segment of interest is that of the text attribute (S901). If the segment of interest is that of the text attribute, the flow advances to step S902 to make character recognition using an arbitrary pattern matching scheme, thus obtaining a corresponding character code.

If the segment of interest is other than that of the text attribute, vector conversion based on the outline of the image is executed (S912), as will be described in detail later.

In case of the segment of the text attribute, horizontal and vertical projections of pixel values are calculated to determine horizontal or vertical writing (to determine the direction for typesetting) (S902). The distributions of the projections are evaluated (S903). If the distribution of the horizontal projection is larger, horizontal writing is determined; if that of the vertical projection is larger, vertical writing is determined. Based on this determination result, lines are extracted, and characters are then extracted, thus obtaining character images (S904).

Upon decomposition into a character string and characters, in case of horizontal writing, lines are extracted using the horizontal projection, and characters are extracted based on the vertical projection with respect to the extracted lines. For a vertical writing text region, columns are extracted using the horizontal projection, and characters are extracted from the vertical projection with respect to the extracted columns. Note that each character size can also be detected upon extracting lines and characters.

Next, for each extracted character, an observed feature vector obtained by converting the feature obtained from a character image into a several-ten-dimensional numerical value string is generated (S905). Feature vector extraction may use various known methods. For example, the following method may be used. That is, a character is segmented into meshes, lines which form the character in the meshes are counted as direction-dependent line elements, and a vector having dimensions as many as the number of meshes is defined as a feature vector.

The observed feature vector is compared with feature vectors which are calculated for respective character types and are stored in a feature dictionary to calculate distances between these vectors (S906). The calculated distances are evaluated, and a character type with a smallest distance is determined as a recognition result (S907). Based on the evaluation results of the distances, the smallest distance is compared with a threshold. If the smallest distance is less than the threshold, it is determined that the similarity is high; otherwise, it is determined that the similarity is low (S908). If the smallest distance is equal to or larger than the threshold (if the similarity is low), the character image of interest is more likely to be erroneously recognized as another character with a similar shape. Hence, the recognition result in step S907 is not adopted, the character image is handled in the same manner as a line image, and the outline of the character image is vector-converted (S911). In other words, for the character image which has high probability of a recognition error, visually faithful outline vector data is generated.

On the other hand, if the similarity is high, the recognition result in step S907 is adopted, and font information is output together with a character code, thus recognizing a character font (S909). Note that a plurality of feature dictionaries as many as character types used in character recognition are prepared in correspondence with character shape types, i.e., font types, thus attaining font recognition. Subsequently, each character is converted into vector data with reference to the character code and font information obtained by the character recognition and font recognition using outline data prepared in advance in correspondence with the character code and font information (S910). In case of color image data, a character color is extracted and is recorded together with vector data.

With the above processing, character images included in the segment of the text attribute can be converted into vector data which have approximately faithful shapes, sizes, and colors.

[Vector Conversion Other than Text Region]

For a segment other than that of the text attribute, i.e., that which is determined as the picture, line, or table attribute, black pixel clusters are extracted, and their outlines are converted into vector data. Note that a segment of the photo attribute remains unchanged as image data without vector conversion.

Figure 10:
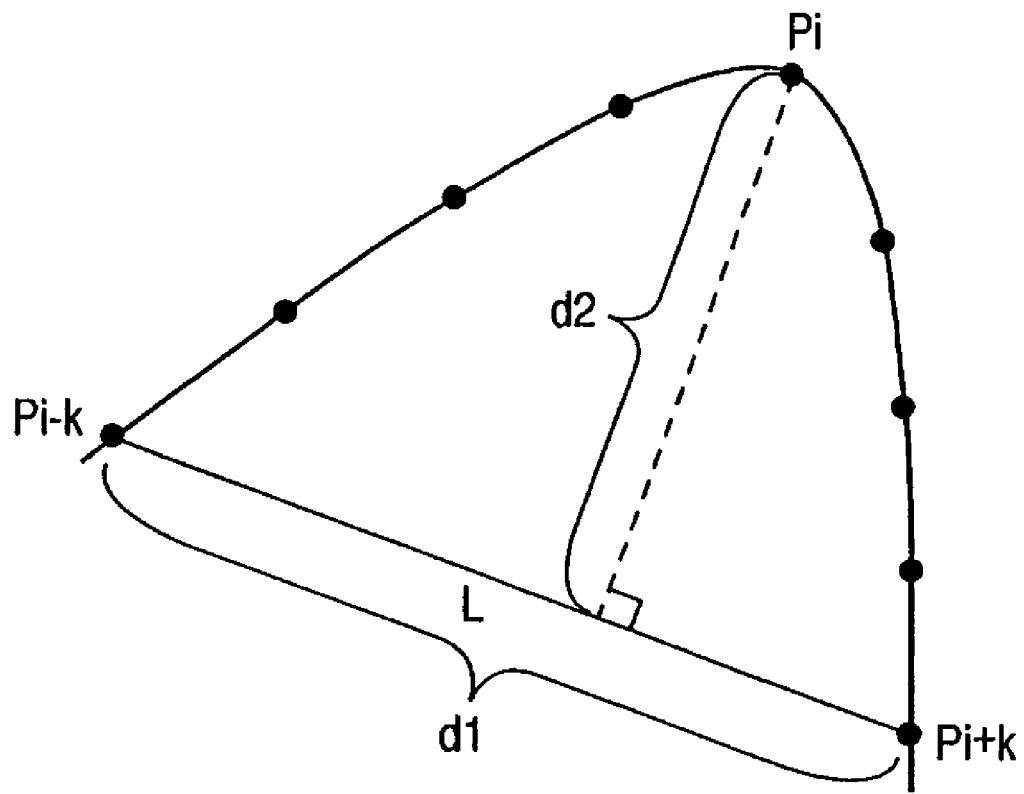
FIG. 10 is a view for explaining corner extraction processing in vector conversion.

Vector conversion of a region other than the text region detects a "corner" which segments a curve into a plurality of sections (pixel arrays), so as to express a line image or the like as a combination of straight lines and/or curves. FIG. 10 is a view for explaining corner extraction processing in vector conversion. A corner is a point which corresponds to a maximal curvature, and whether or not a pixel Pi on a curve shown in FIG. 10 is a corner is determined as follows.

The pixel Pi is defined as a starting point, and pixels Pi−k and Pi+k which are separated from the pixel Pi by the predetermined number k of pixels in two directions along the line image curve are connected by a line segment L. Let d1 be the distance between the pixels Pi−k and Pi+k, and d2 be the length (the distance between the pixel Pi and line segment L) of a line segment dropped from the pixel Pi to the line segment L to cross at right angles. If d2 becomes maximal, or if a ratio d1/A of a length A of an arc between the pixels Pi−k and Pi+k and the distance d1 becomes equal to or smaller than a predetermined threshold, the pixel Pi is determined as a corner.

After the corner is detected, pixel arrays of the line image curve segmented by the corner are approximated by straight lines or curves. Approximation to a straight line is executed by a method of least squares or the like, and that to a curve uses a ternary spline function or the like. The pixel of the corner that segments pixel arrays becomes the start or terminal end of the approximated straight line or curve.

Furthermore, it is checked if an inside outline of a white pixel cluster exists within the vector-converted outline. If such inside outline exists, that outline is vector-converted, and inside outlines of the black and white pixel clusters are recursively vector-converted, taking an inside outline in each inside outline.

As described above, using the method of approximating partial lines of an outline by straight lines or curves, the outline of a picture with an arbitrary shape can be vector-converted. When an input image is a color image, the color of a picture is extracted from the color image, and is recorded together with vector data.

Figure 11:
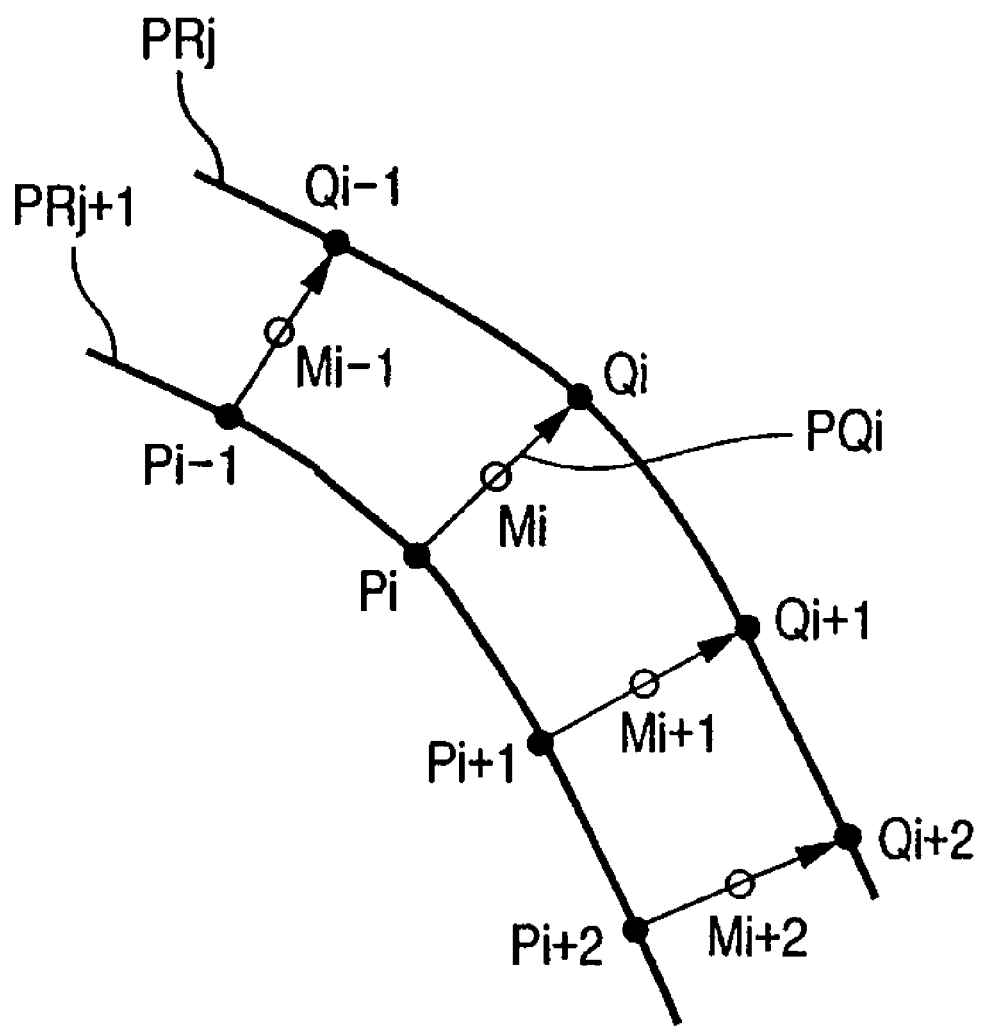
FIG. 11 is a view for explaining processing for grouping outlines in vector conversion.

FIG. 11 is a view for explaining processing for grouping outlines in vector conversion.

When an outside outline PRj is close to an inside outline PRj+1 or another outside outline within a section of interest of outlines, two or three or more outlines are combined to express a line having a given width. For example, it is executed the following steps of: (1) calculating each of distances PQn (n=i−1, i, i+1, i+2, and so on) between pixels Pn on the outline PRj+1 and pixels Qn on the outline PRj which have shortest distances from the pixels Pn; (2) when variations of the distances PQn (n=i−1, i, i+1, i+2, and so on) between a plurality of pixels are slight, approximating the section of interest of the outlines PRj and PRj+1 with a straight line or curve along a point sequence of middle points Mn of line segments PQn (n=i−1, i, i+1, i+2, and so on); and (3) determining the width of the approximated straight line or curve along the point sequence of the middle points Mn, for example, the average value of the distances PQn (n=i−1, i, i+1, i+2, and so on).

A line or a table ruled line as a set of lines can be efficiently vector-converted by expressing them as a set of lines having a width.

[Recognition of Picture]

After the outlines of a line picture or the like are vector-converted, vector-converted partial lines are grouped for each picture object.

Figure 12:
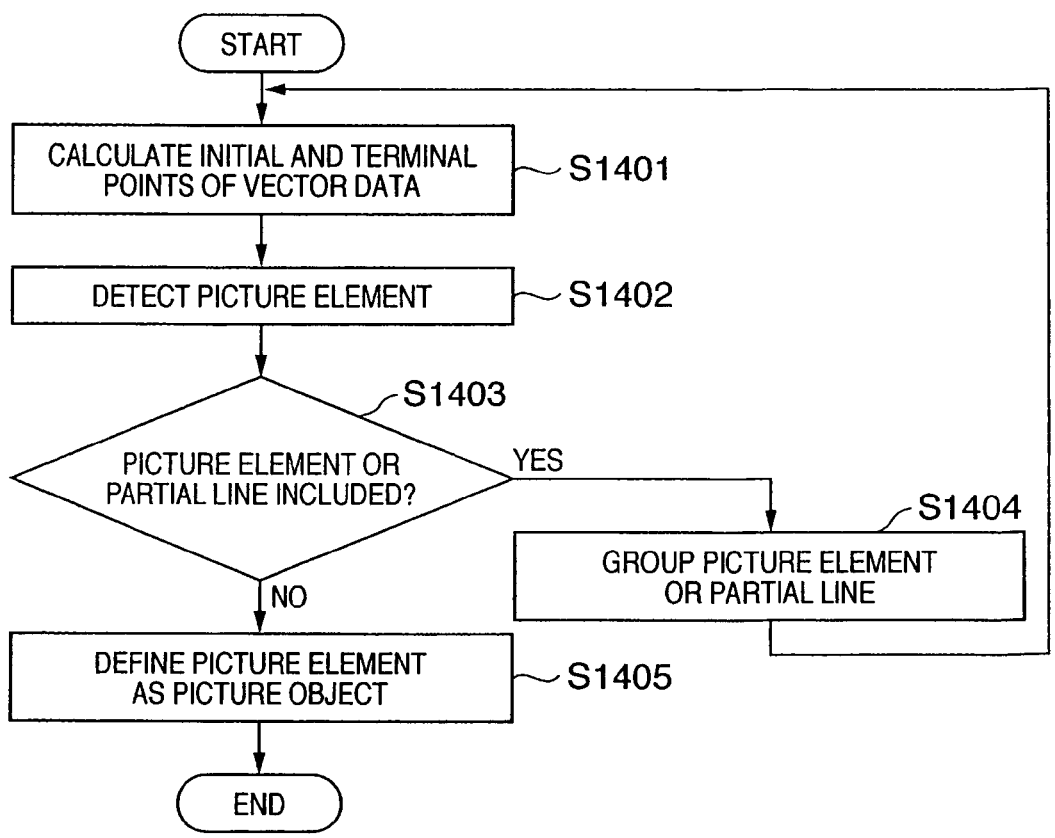
FIG. 12 is a flowchart showing grouping processing of vector data generated by vector conversion.

FIG. 12 is a flowchart showing grouping processing of vector data generated by vector conversion, i.e., processing for grouping vector data for each picture object.

Initial and terminal points of each vector data are calculated (S1401) to detect a picture element using the information of the initial and terminal points (S1402). Note that the picture element is a closed picture formed by partial lines, and vectors are connected at common corner pixels serving as the initial and terminal ends upon detection. That is, a principle that vector groups forming closed shapes have vectors to be connected at their two ends is applied.

Next, it is checked if another picture element or partial line exists in the picture element (S1403). If such picture element or partial line exists, steps S1401 and S1402 are recursively repeated. Then, these elements or lines are grouped to form a picture object (S1404). If no other picture element or partial line exists in the picture element, that picture element is defined as one picture object (S1405).

Note that FIG. 12 shows processing for only one picture object. If another picture object exists, the processing in FIG. 12 is repeated accordingly.

Detection of Picture Element (S1402)

Figure 13:
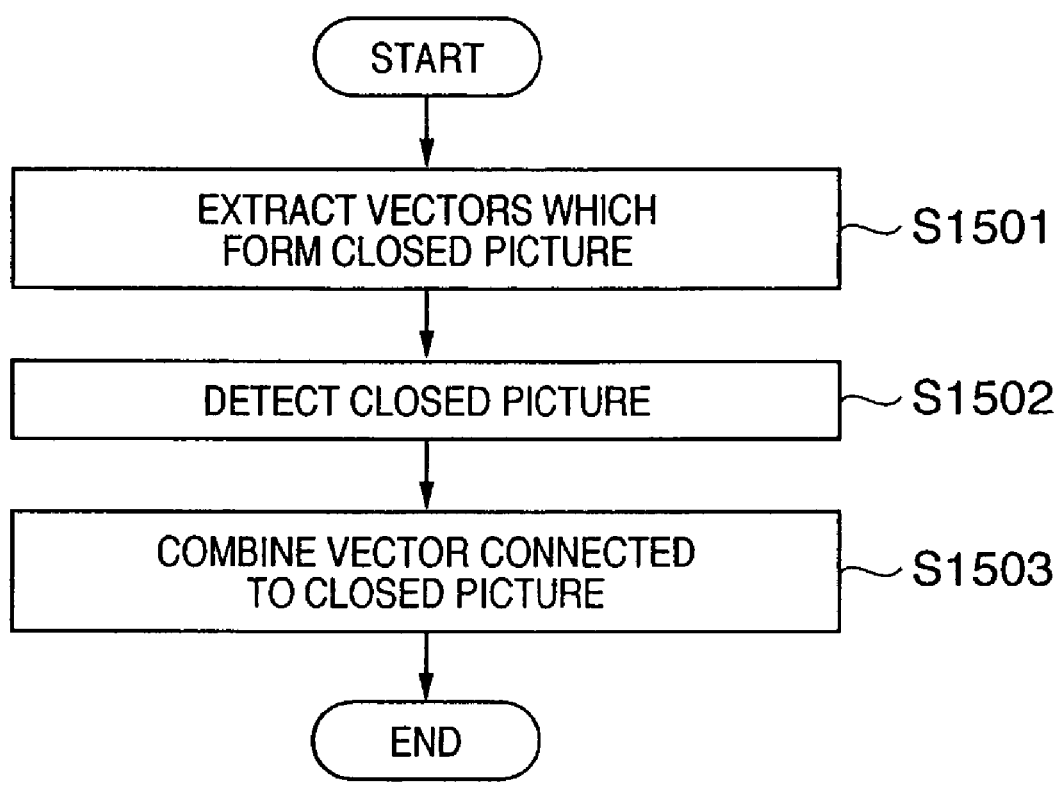
FIG. 13 is a flowchart showing detection processing of picture elements.

FIG. 13 is a flowchart showing the detection processing of picture elements.

Vectors which do not have any vectors, two ends of which are not coupled to other vectors, are excluded from vector data to extract vectors which form a closed picture (S1501).

As for the vectors which form the closed picture, one end point (initial or terminal point) of a vector of interest is set as a start point, and vectors are searched in a predetermined direction (e.g., clockwise). That is, the end point of the other vector is searched for at the other end point, and the closest end point within a predetermined distance is defined as an end point of a vector to be connected. When all the vectors which form the closed picture are traced once until the start point is reached, all the passed vectors are grouped as a closed picture which form one picture element (S1502). Also, all vectors which form a closed picture present in the closed picture are recursively grouped. Furthermore, the initial point of a non-grouped vector is set as a start point to repeat the same processing.

Of the excluded vectors, a vector (a vector to be connected to the closed picture) whose end point is close to the vectors grouped as the closed picture is detected, and the detected vector is grouped into that group (S1503).

[Edit and Print Image]

Figure 14:
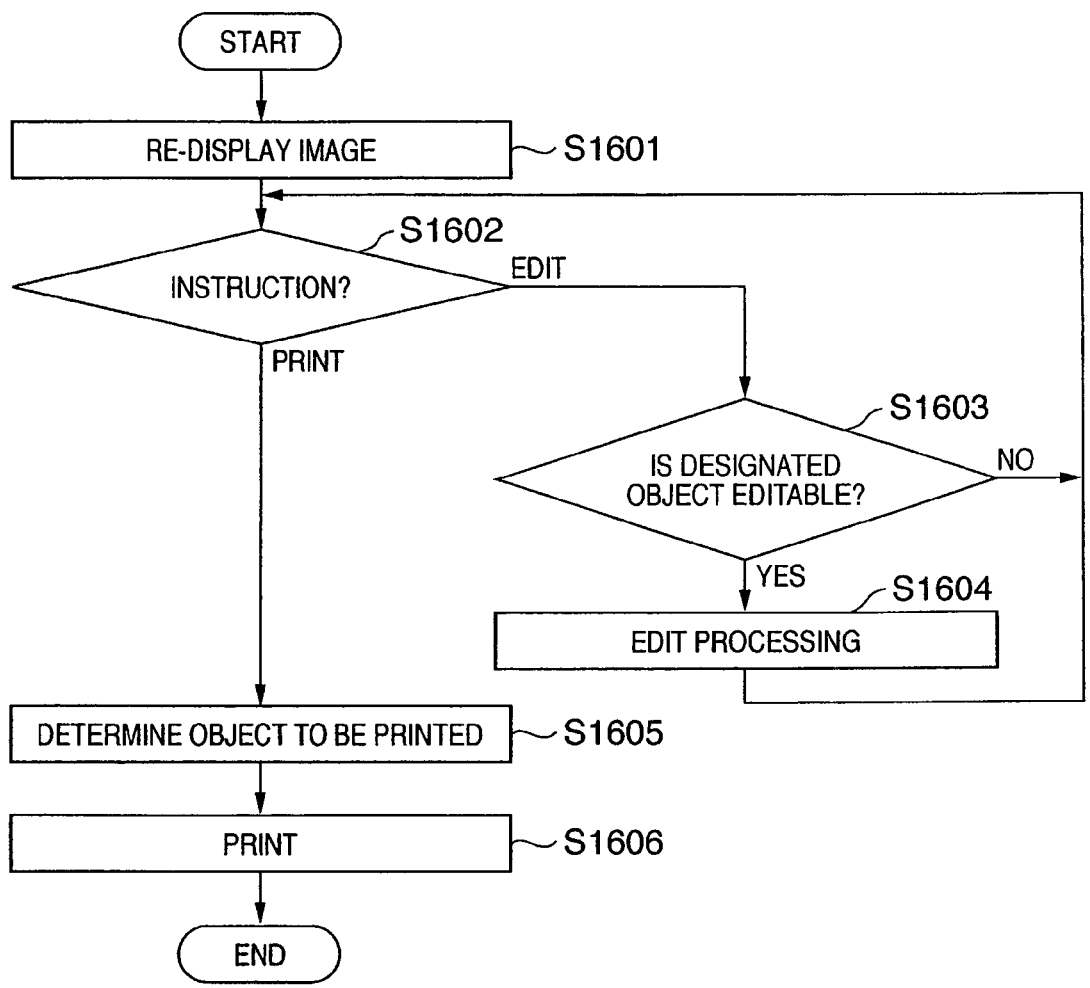
FIG. 14 is a flowchart showing the flow of editing and printing an image.

FIG. 14 is a flowchart showing the flow of processing for editing and printing an image.

After reusable data for respective images of a document image are generated by the processing shown in FIG. 3, and the reusable data and pointer information to original data are obtained, these images can be edited. Of course, if the security level of original data is higher than that of the user, that original data cannot be edited or printed.

Figure 15:
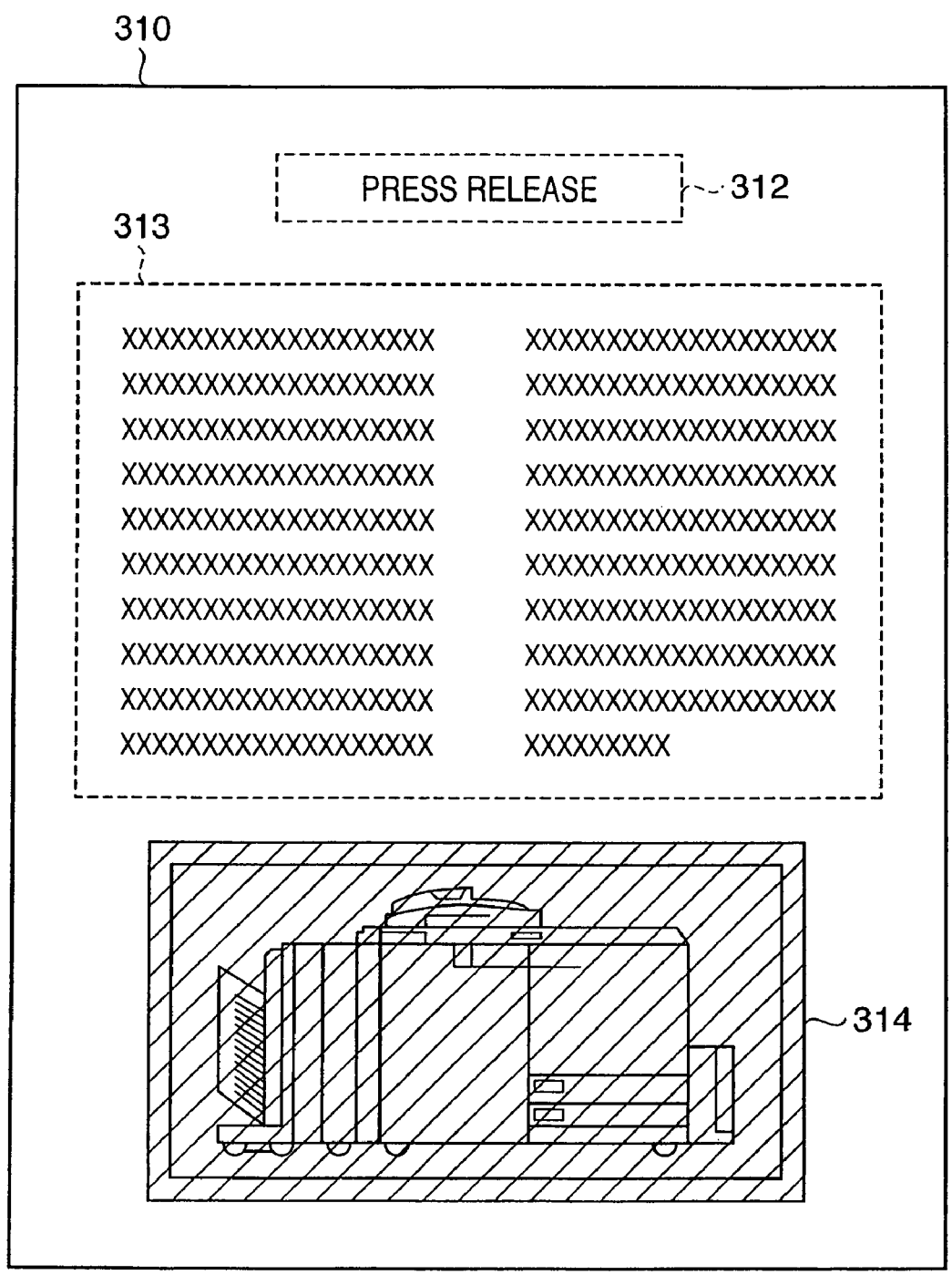
FIG. 15 shows a re-displayed image.

If the user inputs an image edit (or print) instruction by operating the input unit 113 after the processing in FIG. 3, the data processor 115 re-displays a document on the display unit 116 (S1601). FIG. 15 shows a re-displayed document 310. On the document 310, a text object 312 whose reusable data or original data has security level "1", text object 313 whose reusable data or original data has security level "2", and photo object 314 whose reusable data or original data has security level "5" are included. In the following description, the security level of the reusable data or original data will be referred to as "security level of an object".

If the security level of the user is "4", the user can edit (change processing including enlargement/reduction, movement/rotation, and all or partial deletion) the text objects 312 and 313 having lower security levels. However, the photo object 314 having a higher security level is hatched, and cannot be edited.

If the user wants to edit object, he or she designates an object to be edited on the display unit 116, and inputs an edit instruction by operating the input unit 113 (S1602). The object can be designated using, e.g., a touch panel or pointing device.

Next, the data processor 115 compares the security level of the designated object with that of the user to check if the designated object can be edited (S1603). If the user designates the photo object 314, since that object cannot be edited, a message that advises accordingly is displayed on the display unit 116, and the flow returns to step S1602. On the other hand, if the object can be edited, the edit processing of the designated object is permitted (S1604). If the user inputs an edit end instruction of the designated object by operating the input unit 113, the data processor 115 controls the flow to return to step S1602.

FIG. 16 shows an edit example of an object. In this example, a character string "press release" of the text object 312 is enlarged and underlined, and a date is added.

On the other hand, if the user inputs a print instruction (S1602), the data processor 115 compares the security level of the designated object with that of the user to determine if each object can be printed (S1605). Then, the reusable data or original data of printable objects are rendered to be converted into print data. After pointer information, security information, and the like of the entire document and respective objects are embedded in the print data, the print data is sent to the printer unit 112 (S1607).

When the document shown in FIG. 16 is printed to have the same combination of the security level as in the above example, a document from which the photo object 314 is excluded is printed. Of course, if the user whose security level is "5" inputs a print instruction, a document including the photo object 314 can be printed.

Modification of Embodiment

In the above description, the method of embedding pointer information and security level information of the entire document and respective images using a two-dimensional code or digital watermark has been explained. However, information shown in FIG. 8 is registered in, e.g., the database server 105 as form data. Then, pointer information to a server in which the form data is registered and a form data name may be embedded in a document using a two-dimensional code or digital watermark. In this way, the pointer information and form data name are extracted upon scanning a document image, and required data can be extracted from the server.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-084513, filed Mar. 23, 2005, which is hereby incorporated by reference herein in its entirety.

What is claimed is:

1. An image processing apparatus comprising:
an authentication section, arranged to authenticate a user;
a segmentation section, arranged to segment an image read by a reader into image regions having different attributes;
an extractor, arranged to extract pointer information of the image regions segmented by said segmentation section;
a converter, arranged to convert an image of the image region, whose vector conversion is instructed by the user and in a case of no pointer information is extracted by said extractor, into vector data;
a setter, arranged to set a security level of the vector data converted by said converter;
a register, arranged to register the vector data set with the security level in a server;
an obtaining section, arranged to obtain a security level set to data corresponding to each of the image regions, in a case of the pointer information of each of the image regions is extracted by said extractor, from the server based on the extracted pointer information; and
a determiner, arranged to determine whether or not the data corresponding to each of the image regions can be edited or printed by comparing the security level obtained by said obtaining section, and a security level of the user authenticated by said authentication section.

2. The apparatus according to claim 1, wherein said register records an ID of the user authenticated by said authentication section in the vector data.

3. The apparatus according to claim 1, further comprising:
an acquiring section, arranged to acquire the data from the server based on the pointer information extracted by said extractor; and
an editor, arranged to edit the data acquired by said acquiring section, which corresponds to the editable image of the image region that is determined by said determiner.

4. The apparatus according to claim 1, further comprising:
an acquiring section, arranged to acquire the data from the server based on the pointer information extracted by said extractor; and
a printer, arranged to print an image using the data acquired by said acquiring section, which corresponds to the printable image of the image region that is determined by said determiner.

5. The apparatus according to claim 4, wherein said printer embeds the pointer information and the security level of each image region to be printed in that image region.

6. The apparatus according to claim 1, further comprising a changing section, arranged to change a security level of vector data registered in the server.

7. The apparatus according to claim 1, further comprising a reader, arranged to read the document image.

8. The apparatus according to claim 1, wherein said determiner further determines whether or not the vector data registered by said register can be edited or printed by comparing the security level of the vector data set by said setter and the security level of the user authenticated by said authentication section.

9. An image processing method comprising:
using a processor to perform the steps of:
authenticating a user;
segmenting an image read by a reader into image regions having different attributes;
extracting pointer information of the image regions segmented in the segmenting step;
converting an image of the image region, in a case of no pointer information of the image region is extracted in the extracting step and whose vector conversion is instructed by the user, into vector data;
setting a security level of the vector data converted in the converting step;
registering the vector data set with the security level in a server;
obtaining a security level set to data corresponding to each of the image regions, in a case of the pointer information of each of the image regions is extracted in the extracting step, from the server based on the extracted pointer information; and
determining whether or not the data corresponding to each of the image regions can be edited or printed by comparing the security level obtained in the obtaining step and a security level of the user authenticated in the authenticating step.

10. The method according to claim 9, wherein the registering step includes a step of registering an ID of a user authenticated in the authentication step in the server in association with the vector data.

11. The method according to claim 9, wherein the processor to further perform the steps of:
acquiring the data from the server based on the pointer information extracted in the extracting step; and
editing the data which corresponds to the image of the image region that is determined to be editable in the determining step and is acquired from the server in the acquiring step.

12. The method according to claim 9, wherein the processor to further perform the steps of:
acquiring the data from the server based on the pointer information extracted in the extracting step; and
printing an image using the data which corresponds to the image of the image region that is determined to be printable in the determining step and is acquired from the server in the acquiring step.

13. The method according to claim 12, wherein the printing step includes a step of embedding the pointer information and the security level of each image region to be printed in that image region.

14. The method according to claim 9, wherein the processor to further perform the step of changing a security level of vector data registered in the server.

15. The method according to claim 9, wherein it is further determined in the determining step whether or not the vector data registered in the registering step can be edited or printed by comparing the security level of the vector data set in the setting step and the security level of the user authenticated in the authenticating step.

16. A non-transitory computer-readable storage medium storing a computer-executable program for causing a computer to perform an image processing method, the method comprising the steps of:
authenticating a user;
segmenting an image read by a reader into image regions having different attributes;
extracting pointer information of the image regions segmented in the segmenting step;
converting an image of the image region, in a case of no pointer information of the image region is extracted in the extracting step and whose vector conversion is instructed by the user, into vector data;

setting a security level of the vector data converted in the converting step;

registering the vector data set with the security level in a server;

obtaining a security level set to data corresponding to each of the image regions, in a case of the pointer information of each of the image regions is extracted in the extracting step, from the server based on the extracted pointer information; and determining whether or not the data corresponding to each of the image regions can be edited or printed by comparing the security level obtained in the obtaining and a security level of the user authenticated in the authenticating step.

* * * * *